(12) United States Patent
Lauer (10) Patent No.: US 7,088,487 B2
(45) Date of Patent: Aug. 8, 2006

(54) MODIFIABLE ASSEMBLY OF MICROSCOPIC APERTURES

(76) Inventor: Vincent Lauer, 1 villa de Beauté, Nogent sur Marne (FR) 94130

( * ) Notice: Subject to any disclaimer, the term of this patent is extended or adjusted under 35 U.S.C. 154(b) by 0 days.

(21) Appl. No.: 10/474,269

(22) PCT Filed: Apr. 9, 2002

(86) PCT No.: PCT/FR02/01222

§ 371 (c)(1),
(2), (4) Date: Jul. 21, 2004

(87) PCT Pub. No.: WO02/084367

PCT Pub. Date: Oct. 24, 2002

(65) Prior Publication Data

US 2005/0007641 A1   Jan. 13, 2005

(30) Foreign Application Priority Data

Apr. 10, 2001  (FR) .................................. 01 04841
Sep. 18, 2001  (WO) ...................... PCT/FR01/02890
Jan. 22, 2002  (FR) .................................. 02 00780

(51) Int. Cl.
*G02B 26/08* (2006.01)

(52) U.S. Cl. ...................... 359/233; 359/368; 359/385; 359/222; 359/234; 359/235

(58) Field of Classification Search ................ 359/368, 359/385, 222, 233–235
See application file for complete search history.

(56) References Cited

U.S. PATENT DOCUMENTS 5,162,941 A * 11/1992 Favro et al. ................. 359/386
5,717,519 A *  2/1998 Sugiyama et al. .......... 359/368
5,969,846 A * 10/1999 Kishi .......................... 359/227
5,978,095 A * 11/1999 Tanaami ..................... 356/445

* cited by examiner

*Primary Examiner*—Euncha P. Cherry
*Assistant Examiner*—Pranav Khatri (57) ABSTRACT

The invention concerns a modifiable assembly of microscopic apertures comprising several plates (100, 110) coated with an opaque deposition except on transparent parts, for example (101, 114, 115), capable of sliding relative to one another, separated by an oil layer (117). The invention is applicable to microscopic apertures for single-point or multiple-point confocal microscopy.

7 Claims, 12 Drawing Sheets

MODIFIABLE ASSEMBLY OF MICROSCOPIC APERTURES

BACKGROUND

1. Technical Field

The invention concerns a microscopic hole or a set of microscopic holes (pinholes), the number of these holes and/or their size being able to be modified easily. Such a set of pinholes is intended to be used for various applications in optics, in particular in confocal microscopy.

2. State of the Art

In confocal microscopy use is usually made of two types of pinhole:

holes of fixed size: to modify the size of a hole, it is necessary to replace it with another. Typically several pinholes can be mounted on a wheel having a position corresponding to the use of each of these holes. The movement of the wheel must be very precise.

holes of variable size: functioning on the principle of the iris diaphragm, they require at least three blades which form a hole by crossing one another and are expensive because of the relative complexity of the mechanism.

Conventionally, confocal microscopy systems require the use of a single pinhole. For example, the first embodiment of French patent application number 0103860 of 22 Mar. 2001, as well as the microscope described in FIG. 3 of the U.S. Pat. No. 5,978,095 or the microscope described in the U.S. Pat. No. 5,162,941.

Other confocal microscopy systems require the use of an array of pinholes. For example, the microscopes described by FIG. 1 of U.S. Pat. No. 5,239,178 or FIG. 3 in the U.S. Pat. No. 5,978,095, or the Nipkow disk systems.

In certain embodiments of a microscope such as the one described in French patent number 0103860 of 22 Mar. 2001; an array of pinholes must be positioned with great precision, which is difficult using a simple technique consisting of exchanging the whole of the array. When "single" pinholes are simply exchanged, as on certain single-point confocal microscopes, their precise positioning is also difficult. In addition, the systems for exchanging arrays of pinholes are necessarily bulky, since their size is the sum of the sizes of each array able to be exchanged.

In the case of microscopes using an array of pinholes, the size and density of the holes cannot usually be modified. However, this modification is desirable in order to adapt the size of the holes to the wavelength being studied. U.S. Pat. No. 6,002,509 affords a solution to this problem in the case of a Nipkow disk microscope. However, this solution requires the replacement of the array of holes with an array of reflective points. When the technique used consists of using reflective points produced by a multilayer treatment, each wavelength corresponds to a given size and density of the reflective points. It is then not possible to modify the size or density of the holes of the hole with a given wavelength, and the number of different sizes of holes is limited by the performance of the multilayer treatment. When the technique used consists of introducing several concentric rings on the Nipkow disk, a movement of the disk, which is not very practical, is necessary, and the size of the disk rapidly becomes excessive. The technique is difficult to adapt to systems using a fixed array of pinholes.

SUMMARY OF THE INVENTION

The object of the invention is a set of one or more pinholes of variable size and/or number, the changes to which are obtained by a simplified method which is precise and inexpensive. In particular, one object of the invention is to produce pinholes which can be modified without problems in positioning and which are of reduced bulk. "Holes" means holes in the optical sense of the term, that is to say small areas through which light can pass, not necessarily void. A "hole" can for example be an interruption in an opaque layer deposited on glass.

To this end, the invention provides a modifiable array of microscopic pinholes for filtering a light beam in a confocal microscope, comprising:

a fixed plate (310) carrying a first array of pinholes;

a movable plate (300) carrying a second array of pinholes, each hole of the modifiable array being formed by the superimposition of a pinhole (311) of the fixed plate and a pinhole (301) of the movable plate, means to move the movable plate with respect to the fixed plate, from a first position in which each pinhole of the fixed plate is superimposed on a corresponding pinhole of the movable plate, to a second position in which each pinhole of the fixed plate is superimposed on a corresponding pinhole of the movable plate;

wherein:

the pinholes (301) of the movable plate that are superimposed on the pinholes (311) of the fixed plate in the first position differ from the pinholes (302) of the movable plate that are superimposed on the pinholes (311) of the fixed plate in the second position; and the pinholes (301) of the movable plate that are superimposed on the pinholes (311) of the fixed plate in the first position have a different size than the pinholes (302) of the movable plate that are superimposed on the pinholes (311) of the fixed plate in the second position;

whereby the size of the pinholes of the modifiable pinholes array when the movable plate is in the first position differs from the size of the pinholes of the modifiable pinholes array when the movable plate is in the second position This particular arrangement simplifies the design of the system and makes it possible to produce arrays of modifiable pinholes, whilst typically iris diaphragms are designed only for a single modifiable pinhole.

A modifiable set of pinholes can also be obtained by a system physically exchanging two sets of pinholes produced on different plates. This solution is used in certain single-point confocal microscopes. The present invention is distinguished from this simple technical solution by the use of several superimposed plates, which makes it possible to modify the array of pinholes by means of movements which are also microscopic, rather than macroscopic as is the case in the state of the art. This simplifies the positioning problems.

The pinholes can be of various shapes. For example round, square or hexagonal pinholes are commonly used. These examples are not limitative and the pinholes may be of still different shapes.

Various techniques for producing plates can be employed. For example, and according to one characteristic of the invention, two of said plates can be transparent windows on which said pinholes are produced by the deposition of an opaque layer by a lithographic method. The opaque layers on these two plates can then be turned towards each other, so that the space separating them is as small as possible. The advantage of this technique is that the windows have good rigidity (deform little).

According to one characteristic of the invention, the plates are separated from each other by layers of a transparent lubricating liquid. This is because, in the contrary case, friction between the plates make correct functioning difficult. Another solution is to use plates which do not touch each other, but this solution is difficult since it requires excellent surface evenness of the plates.

Movement of one plate with respect to another can in general take place along two axes. However, the system is simplified, according to one characteristic of the invention, if this movement takes place along only one axis. In this case, it is possible to use a guide rail to help maintain correct relative positioning of the plates. However, such a rail is expensive and poses problems of positioning. In order to facilitate the relative positioning of the plates, and according to one characteristic of the invention, two adjacent plates sliding with respect to each other along one axis are positioned with respect to each other by microscopic guide rails. A microscopic rail being fragile, it is preferable, according to one characteristic of the invention, to use several microscopic guide rails. These rails can for example be produced by lithography.

According to one characteristic of the invention, the moving plate is moved by means of a linear positioner along an axis. Preferably this axis is not along a principal direction of the pinholes array, because this allows more space for pinholes on the moving plate, which are more numerous than on the fixed plate. This solution is preferred. It may also be necessary to move one of the plates by means of a two-axis positioner. This solution is one which allows the maximum flexibility.

BRIEF DESCRIPTION OF THE DRAWINGS

FIGS. 1 to 4 illustrate the principle of the invention, showing only one pinhole.

FIGS. 12 to 14 relate to a method of guiding the plates by means of microscopic rails.

DETAILED DESCRIPTION OF THE PREFERRED EMBODIMENTS

Figure 1:
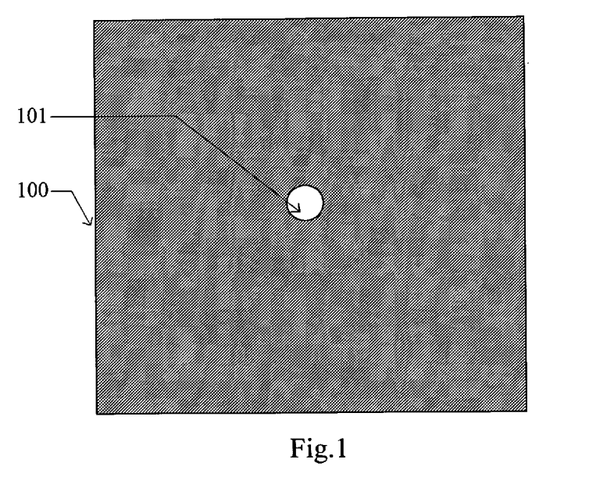
FIG. 1 depicts a fixed plate.

A basic principle of the invention is that a pinhole of modifiable size in the form of a disk is obtained by step by step sliding a movable plate 110 with respect to a fixed plate 100. FIG. 1 depicts the plate 100 comprising a hole 101.

Figure 2:
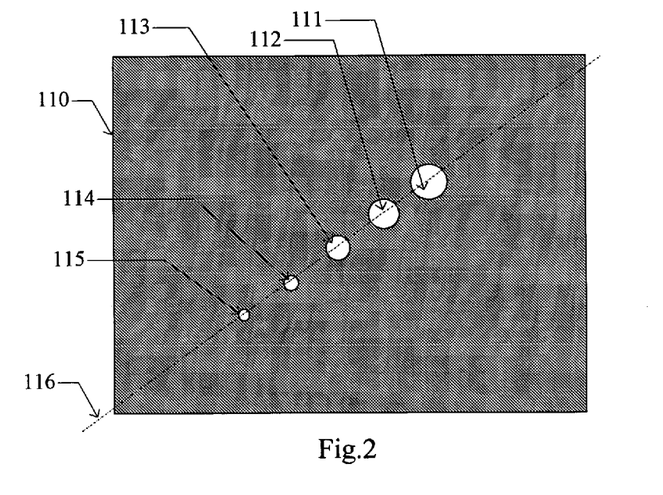
FIG. 2 depicts a movable plate.
Figure 3:
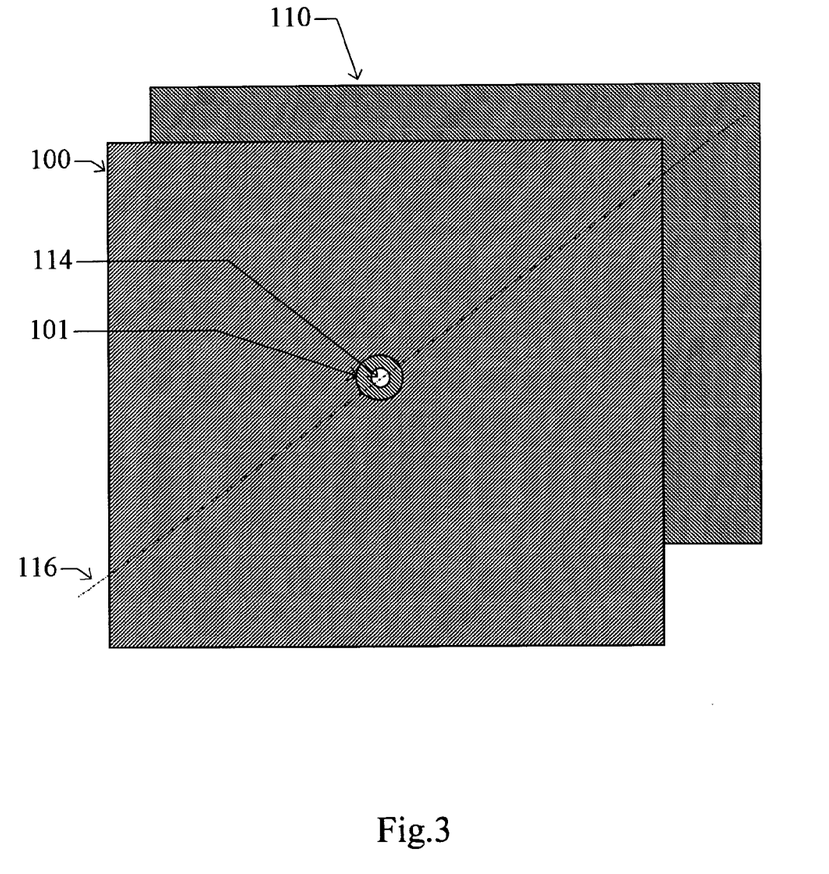
FIG. 3 depicts the superimposition of the two plates, forming a single pinhole of small size.
Figure 4:
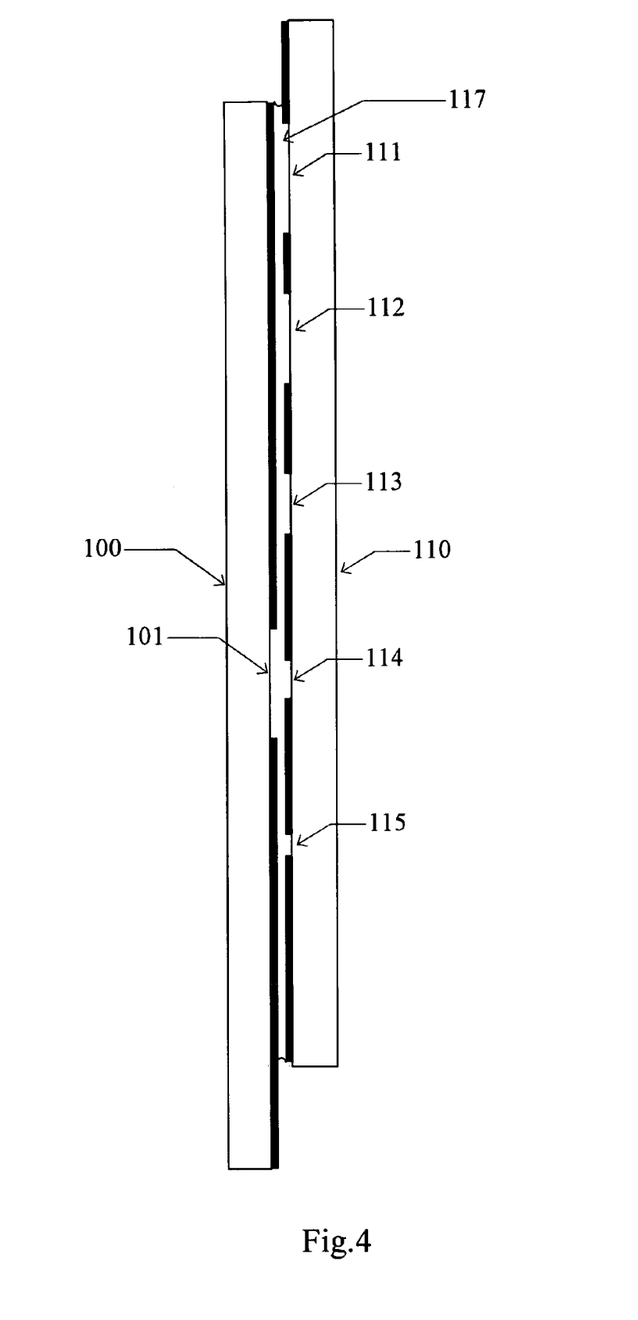
FIG. 4 depicts the same superimposition in section.

FIG. 2 depicts the plate 110 comprising holes 111, 112, 113, 114, 115 aligned on an axis 116. The modifiable pinhole is formed by the two plates A and B placed one against the other. FIG. 3 depicts the modifiable pinhole obtained when the hole 114 is superimposed on the hole 101. FIG. 4 depicts the same superimposition in section along a plane passing through the axis 116. In the position of the plates which is depicted in FIGS. 3 and 4, only the hole 114 can have light passing through it, and the diameter of the modifiable hole is that of the hole 114.

The plate 110 must be mounted on a positioner making it possible to move it in the direction of the axis 116 passing through the set of holes 111 to 115. By sliding the plate 110 with respect to the plate 100, by means of the positioner, it is possible to superimpose any one of the holes 111 to 115 on the hole 101 and therefore to obtain five distinct diameters of the modifiable pinhole. When for example the hole 113, instead of the hole 114, is superimposed on the hole 101, the diameter of the modifiable hole is increased and becomes equal to the diameter of the hole 113.

The pinholes in the plate 110 are not necessarily aligned on the same straight line, however this solution makes it possible to move the plate 110 only along one axis, which minimizes costs. In general terms, it is possible to obtain as many holes with different characteristics as there are holes formed in the plate 110. A guide rail can be used so that the movement of the plate 110 with respect to the plate 100 is restricted to the direction of the axis 116.

The plates 100 and 110 can be glass plates whose opaque parts are metallic layers obtained by a lithographic process. These metallic layers are shown in thick lines in FIG. 4. The two plates are separated by a fine layer 117 of optical liquid, for example oil, in order to prevent any solid rubbing.

Figure 10:
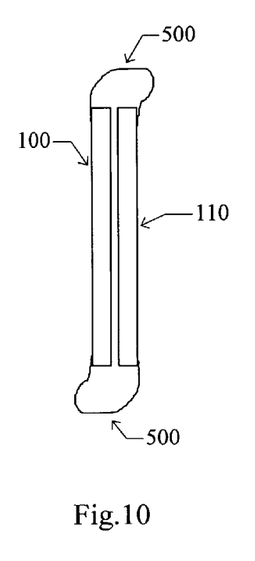
FIG. 10 depicts a device used for preventing leakages of the liquid separating the plates, the device being filled under vacuum.
Figure 11:
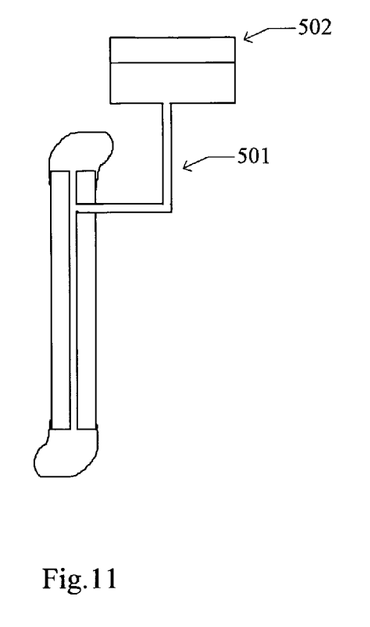
FIG. 11 depicts a similar device but comprising an overflow having a breather.

When the optical liquid is maintained solely by capillary attraction, as indicated in FIG. 4, the qualities of the layer are liable to degrade over time by partial evaporation, and the liquid is also liable to spread into the parts of the optical system other than the areas where its presence is required. In order to avoid these problems the system can be made impermeable as indicated in FIG. 10 by means of a flexible closure 500, for example made from plastic, which closes the whole of the system. The liquid can then be injected under vacuum between the two plates and into the area included inside the flexible closure 500. This device makes it possible to reconcile the movement of the plates 110 and 100 with the absence of leakages of liquid. One alternative to filling under vacuum is the overflow system depicted in FIG. 11. A tube 105 leads into a reservoir 502 provided with a breather and raised up and ensures the maintenance of a level of optical liquid in the area included between the plates.

In all the embodiments of the invention use will preferably be made of glass plates with opaque layers obtained by lithography and turned towards each other, separated by an optical liquid and equipped with a system preventing leakages of liquid. These technological aspects will not be repeated in the remainder of the explanations.

Figure 5:
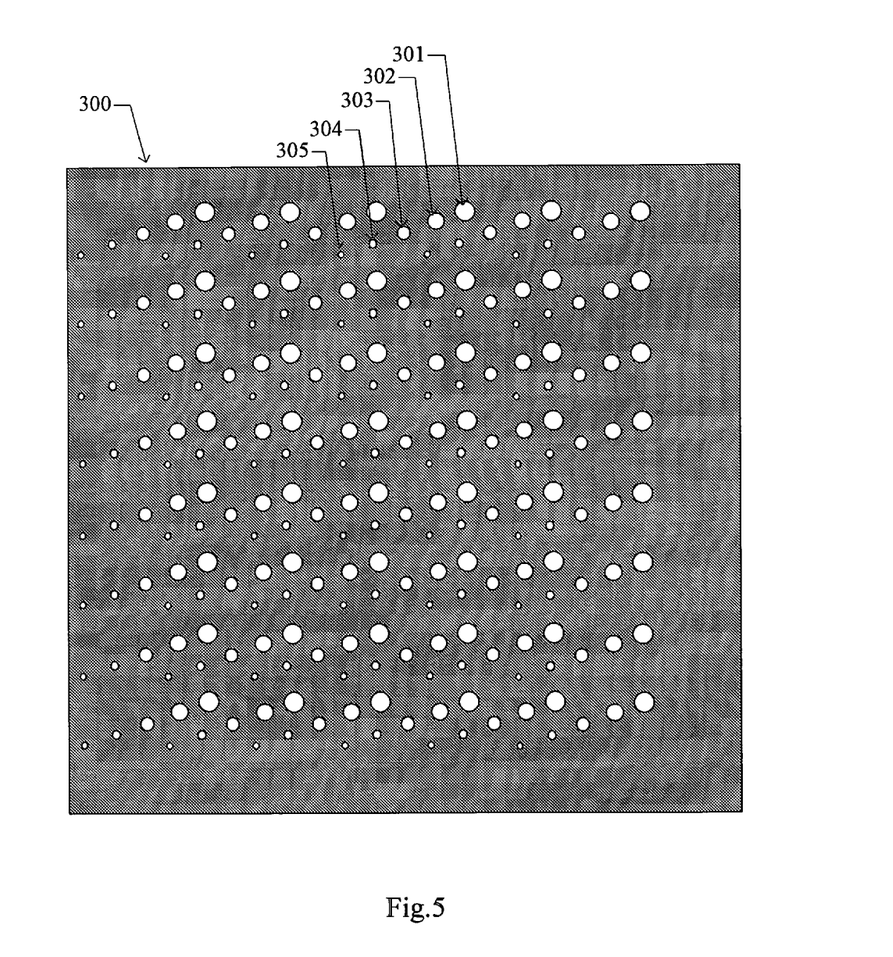
FIG. 5 depicts a movable plate used in a first embodiment.
Figure 6:
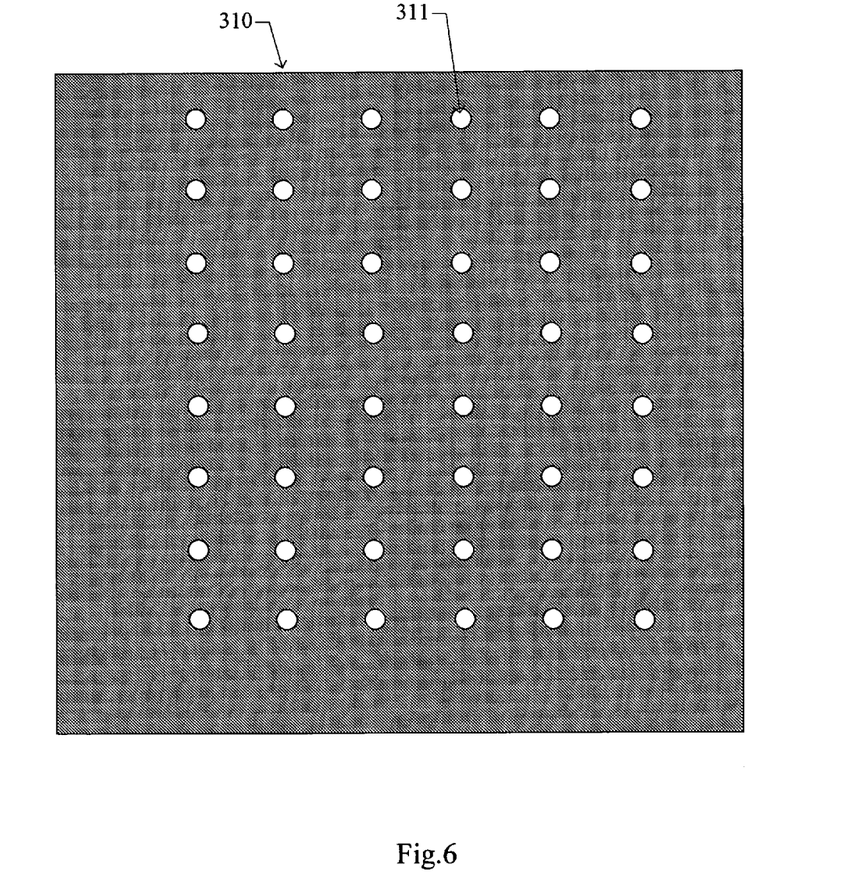
FIG. 6 depicts a fixed plate used in this embodiment.

In the invention the pinholes in both the fixed and the moving plate are replicated in order to obtain an array of modifiable pinholes. The pinholes size can be modified by step by step sliding a movable plate 300 on a fixed plate 310. FIG. 5 depicts an example of a plate 300 and FIG. 6 depicts the corresponding plate 310. The array of modifiable pinholes is formed by plates 310 and 300 placed against each other. When the hole 301 in the plate 300 is superimposed on the hole 311 in the plate 310, the orientation of the plates not being modified compared with the drawing, the array of modifiable pinholes has the appearance of the plate 310 alone, that is to say all the holes in the plate 310 are left free by the plate 300. When the hole 302 in the plate 300 is superimposed on the hole 311 in the plate 310, the diameter of the holes in the array of modifiable pinholes is decreased. When the holes 303, 304, 305 are successively superimposed on the hole 311 in the plate 310, the diameter of the holes in the array of modifiable pinholes is on each occasion decreased. There is therefore in this example an array of modifiable pinholes whose diameter can take 5 distinct values. In general terms, it is possible to produce on this principle an array comprising a large number of pinholes each able to take various sizes or shapes.

Figure 7:
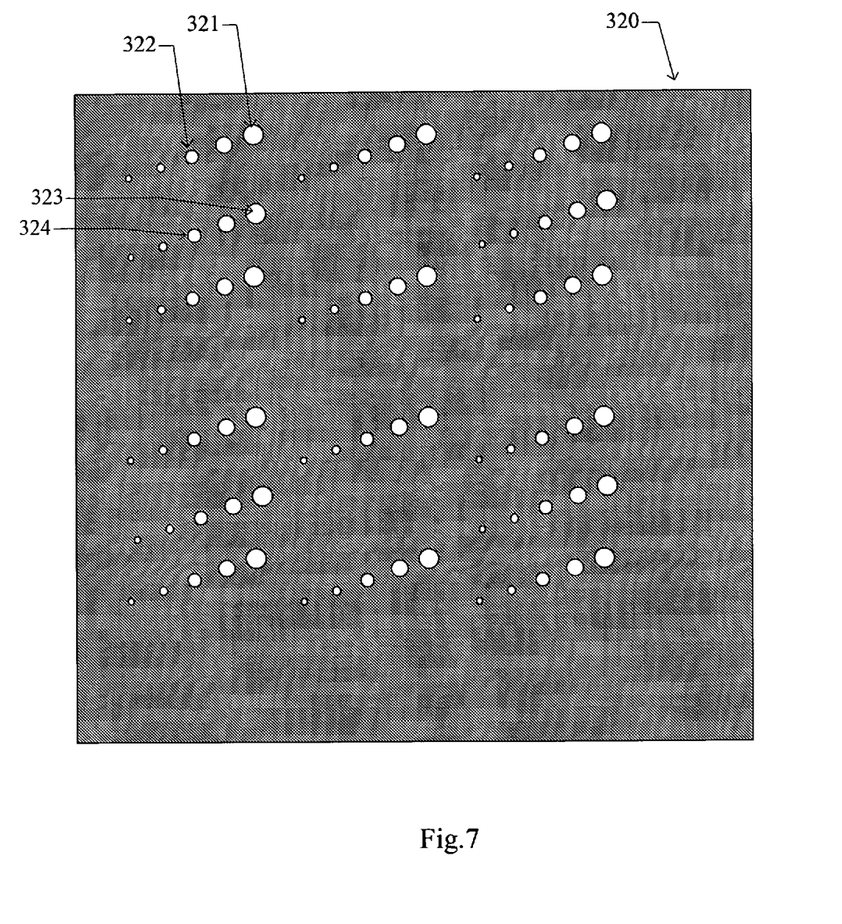
FIG. 7 depicts a movable plate used in a second embodiment.
Figure 8:
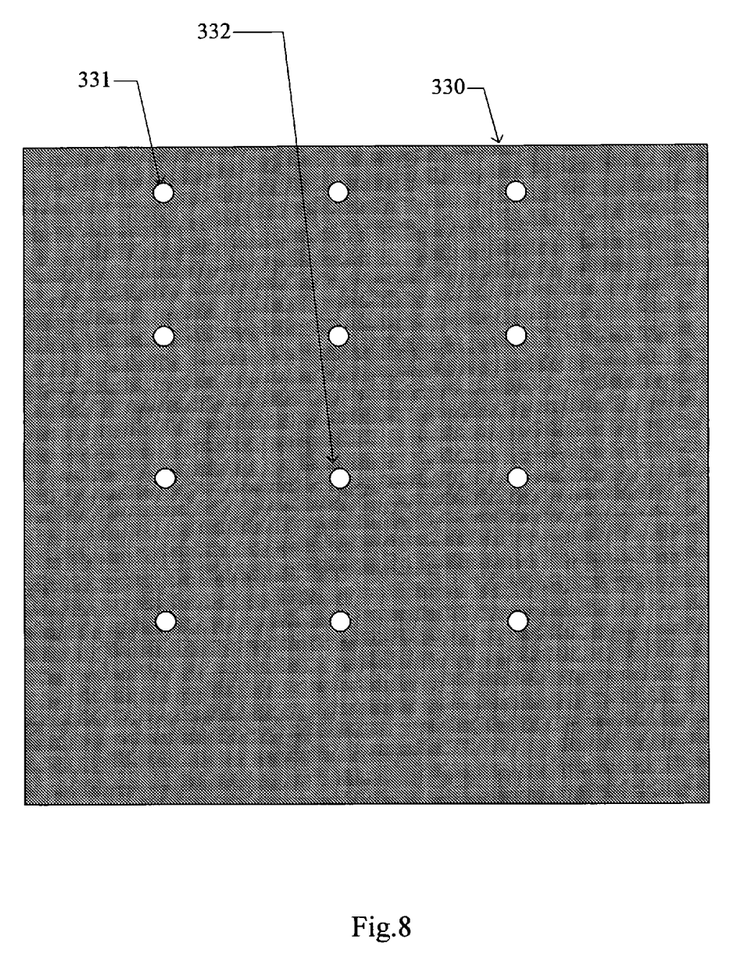
FIG. 8 depicts a fixed plate used in this second embodiment.

The invention is not limited to pinholes arrays where only pinhole size varies. It is possible to obtain holes of variable size and number by sliding a movable plate 320 carrying a second intermediate set of holes on a fixed plate 330 carrying a first intermediate set of holes. FIG. 7 depicts an example of a plate 320 used and FIG. 8 depicts the corresponding plate 330. When the hole 321 in the plate 320 is superimposed on the hole 331 in the plate 330, the array of modifiable pinholes has the appearance of the plate 330 alone, that is to say the 12 holes in the plate 330 are left free by the plate 320. When for example the hole 322 in the plate 320 is superimposed on the hole 331 in the plate 330, the diameter of the holes in the array of modifiable pinholes is decreased but their number is constant. When the hole 323 in the plate 320 is superimposed on the hole 331 in the plate 330, the number of pinholes in the set of modifiable pinholes becomes equal to 4 instead of 12, their diameter being equal to that of the holes in the plate 330, that is to say 6 holes in the plate 330 are concealed by the opaque part of the plate 320, and the other 4 holes are left free. When the hole 324 in the plate 320 is superimposed on the hole 331 in the plate 330, the modifiable set of pinholes comprises 4 holes of reduced diameter. This example therefore constitutes a modifiable set of pinholes, the number of pinholes being able to be equal to 4 or 12, and the diameter of each hole being able to take 5 distinct values. In general terms it is possible to produce on this principle a modifiable array comprising a large number of holes, the size and number of which are both modifiable.

Figure 9:
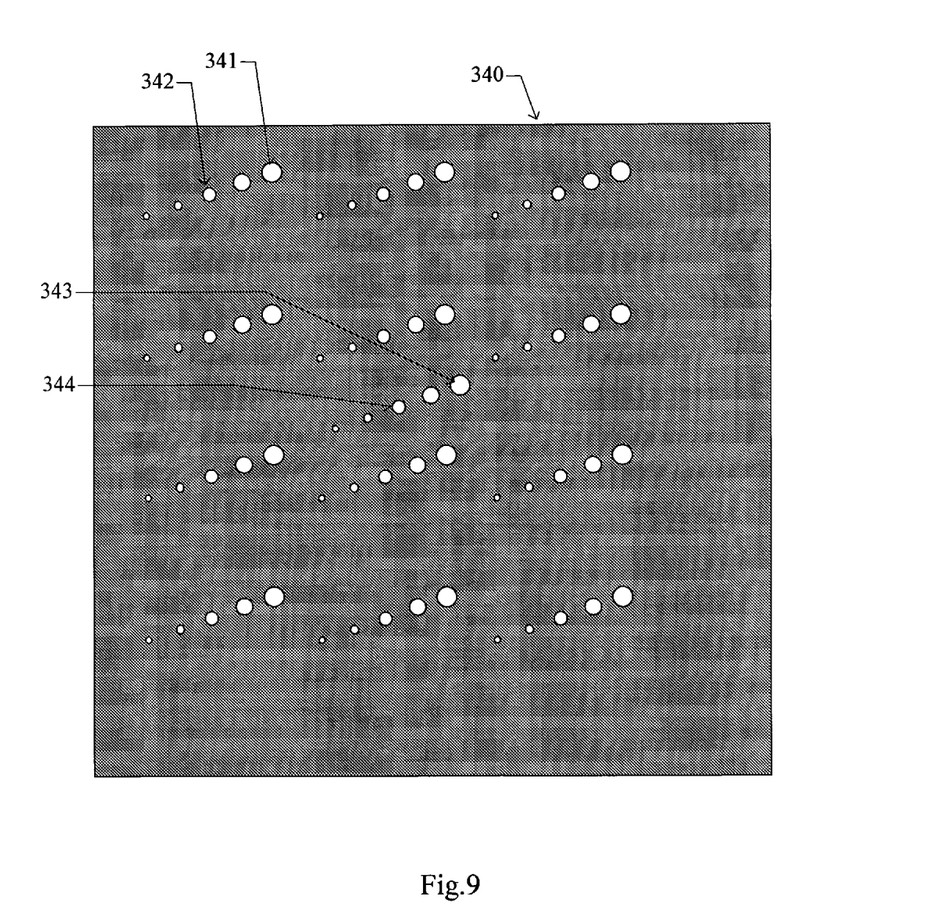
FIG. 9 depicts a movable plate used in a variant of this second embodiment.

Another example of this embodiment uses the same plate 330 but the second intermediate set is formed by the plate 340 depicted in FIG. 9. When the hole 341 in the plate 340 is superimposed on the hole 331 in the plate 330, the array of pinholes modifiable to the appearance of the plate 330 alone, that is to say the 12 holes in the plate 330, are left free by the plate 340. When for example the hole 342 in the plate 340 is superimposed on the hole 331 in the plate 330, the diameter of the holes in the array of modifiable pinholes is decreased but their number is constant. When the hole 343 in the plate 340 is superimposed on the hole 332 in the plate 330, the number of pinholes in the set of modifiable pinholes becomes equal to 1 instead of 12, their diameter being equal to that of the holes in the plate 330, that is to say 11 holes in the plate 330 are concealed by the opaque part of the plate 340 and the other 1 hole is left free. When the hole 344 in the plate 340 is superimposed on the hole 332 in the plate 330, the modifiable set of pinholes comprises only 1 hole of reduced diameter. This example therefore constitutes a modifiable set of pinholes, the number of pinholes being able to be equal to 1 or 12, and the diameter of each hole being able to take 5 distinct values. This type of array of pinholes is particularly useful in a confocal microscope which it is wished to be able to use both in multipoint mode and in single-point mode.

Method of Guiding and Positioning the Plates

In certain embodiments the plates carrying pinholes move in translation with respect to each other along a single axis. This solution simplifies the system in that each plate moves with respect to another along a single axis. As indicated above a guide rail can be used for guiding the plates. However, a macroscopic guide rail is difficult to produce with the required precision. In order to obtain good positioning of the plates it is possible to replace such a guide rail with a set of microscopic guide rails.

Figure 12:
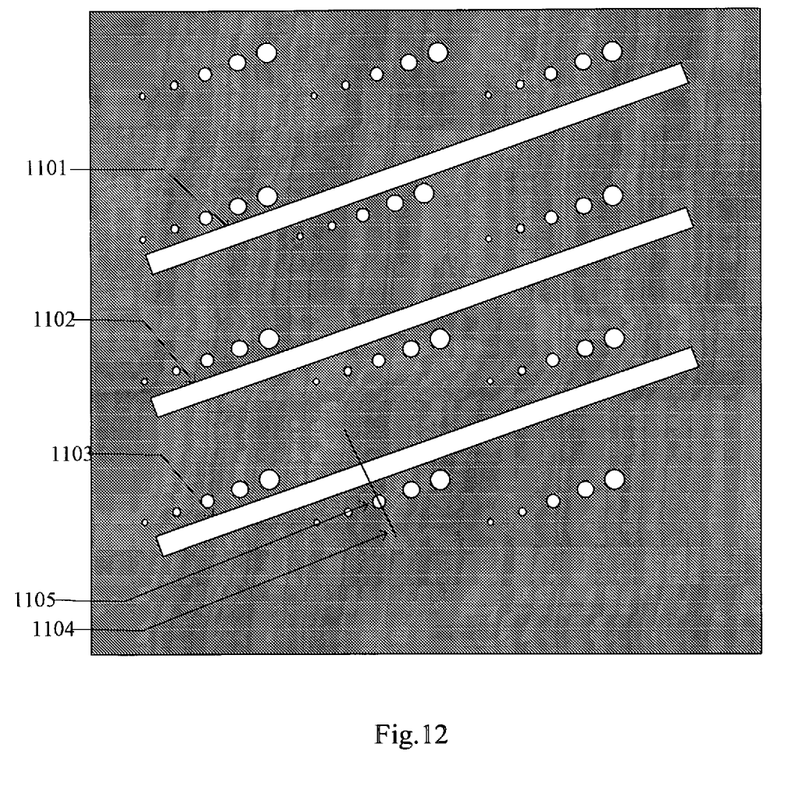
FIG. 12 depicts a movable plate carrying rails.
Figure 13:
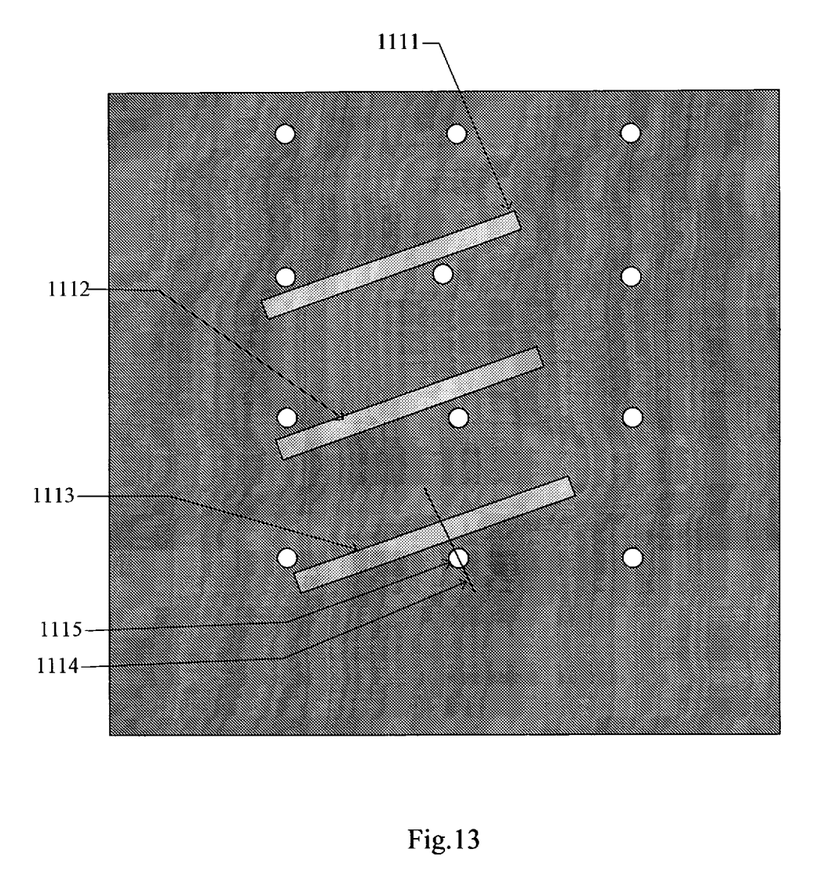
FIG. 13 depicts a movable plate carrying rails corresponding to those of FIG. 12.
Figure 14:
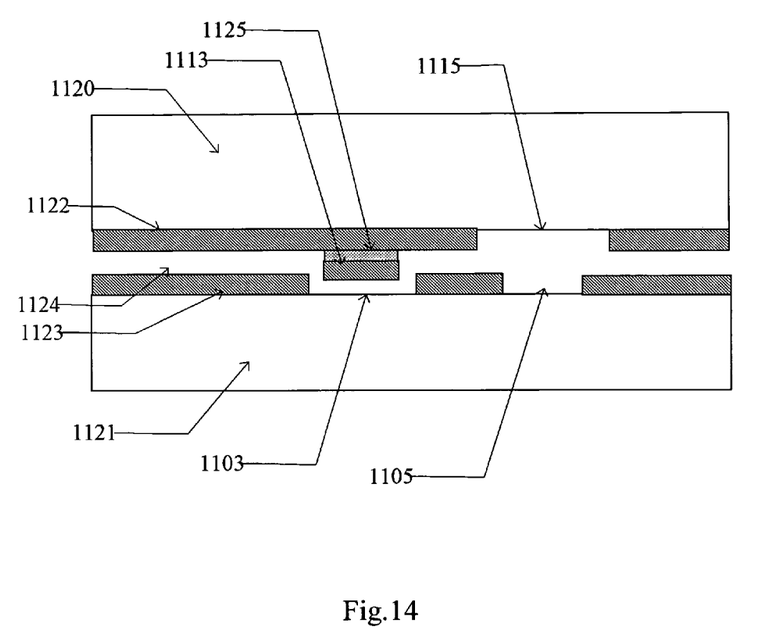
FIG. 14 depicts in section the assembly of two plates produced on plates of thick glass.

FIGS. 12 to 14 illustrate the embodiment of a set of microscopic guide rails in a system with two plates of the type described in the first embodiment. FIG. 12 shows the female part 1101, 1102, 1103 of the rails, produced by lithography in the same way as the pinholes, on the movable plate. FIG. 13 shows the male part 1111, 1112, 1113 of the rails, produced by lithography on the fixed plate, but by means of a supplementary metallic layer. FIG. 14 shows in section the assembly of the rails 1103 and 1113. The cross-section is produced along a cutting axis 1114 of the fixed plate and along a cutting axis 1104 of the movable plate, these two axes being deemed to be superimposed in the position depicted. The fixed glass plate 1121 carries a metallic layer 1122 leaving the pinhole 1115 free. It also carries a supplementary metallic layer 1113 constituting the male part of the guidance system. This male part is produced by lithography and the remains of a layer of resin 1125 have also been shown. The object of this layer of resin is to protect the bottom metallic layer 1122 when the rail 1113 is formed. The movable plate 1120 carries a metallic layer 1123 leaving free the pinhole 1105 and the female part 1103 of the guide rail. The space 1124 included between the two plates is filled with a lubricating liquid for preventing solid friction. The male part 1113 fits in the groove 1103 in order to guide the movement. The superimposition of the pinholes 1115 and 1105 produces a pinhole of reduced size.

On FIG. 13 the guide rails 1111, 1112, 1113 of the fixed plate also show the direction of the movement of the moving plate, which is not along a principal direction of the pinholes array of the fixed plate, shown on the same FIG. 13.

INDUSTRIAL APPLICATIONS

The present set of pinholes can be used in a confocal microscope multipoint illumination or in a confocal microscope intended to alternate single point and multipoint illumination modes. For example, if a set of pinholes of the type described in the present invention replaces the set of pinholes used in the system described by FIG. 1 of U.S. Pat. No. 5,239,178 it becomes possible to modify the size and number of these pinholes and possibly to alternate between a multipoint and a single-point operating mode. Likewise, the array of pinholes in the fourth embodiment of the present invention can replace, with the same effect, the array of pinholes used in FIG. 3 of the U.S. Pat. No. 5,978,095. By using a modifiable array of pinholes according to the present invention in the microscope described by one of the first two embodiments of French patent application number 0103860 of 22 Mar. 2001, it is possible to easily modify the diameter of the pinholes or their number, which affects the speed/resolution or speed/penetration depth compromise in the sample.

The invention claimed is:

1. A modifiable array of microscopic pinholes for filtering a light beam in a confocal microscope, comprising:
   a fixed plate (310) carrying a first array of pinholes;
   a movable plate (300) carrying a second array of pinholes, each hole of the modifiable array being formed by the superimposition of a pinhole (311) of the fixed plate and a pinhole (301) of the movable plate,
   means to move the movable plate with respect to the fixed plate, from a first position in which each pinhole of the fixed plate is superimposed on a corresponding pinhole of the movable plate, to a second position in which each pinhole of the fixed plate is superimposed on a corresponding pinhole of the movable plate;
   wherein:
   the pinholes (301) of the movable plate that are superimposed on the pinholes (311) of the fixed plate in the first position differ from the pinholes (302) of the movable plate that are superimposed on the pinholes (311) of the fixed plate in the second position; and
   the pinholes (301) of the movable plate that are superimposed on the pinholes (311) of the fixed plate in the first position have a different size than the pinholes (302) of the movable plate that are superimposed on the pinholes (311) of the fixed plate in the second position;
   whereby the size of the pinholes of the modifiable pinholes array when the movable plate is in the first position differs from the size of the pinholes of the modifiable pinholes array when the movable plate is in the second position.

2. A modifiable array as claimed in claim 1, the movement of the movable plate being along one axis (116) only, and the different pinholes (111, 112, 113, 114, 115) of the movable plate that correspond to a same pinhole of the fixed plate being aligned along said axis.

3. A modifiable array as claimed in claim 2, wherein said axis (1112) is not along a principal direction of the fixed pinholes array.

4. A modifiable array as claimed in claim 2, the movable plate and the fixed plate being positioned with respect to each other by means of microscopic guide rails (1101, 1102, 1103, 1111, 1112, 1113).

5. A modifiable array as claimed in claim 4, the microscopic guide rails being obtained by a lithographic method.

6. A modifiable array as claimed in claim 1, the movable plate being separated from the fixed plate by a layer (117) of a transparent lubricating liquid.

7. A modifiable array as claimed in claim 1, the fixed plate and the movable plate being transparent windows whose opaque parts are metallic layers and on which the arrays of holes are produced by a lithographic method.

* * * * *